(12) United States Patent
Kuribayashi et al.

(10) Patent No.: US 7,092,341 B2
(45) Date of Patent: Aug. 15, 2006

(54) DATA RECORDING METHOD AND DATA RECORDING MEDIUM

(75) Inventors: Hiroki Kuribayashi, Tsurugashima (JP); Takuma Yanagisawa, Tsurugashima (JP)

(73) Assignee: Pioneer Corporation, Tokyo-To (JP)

( * ) Notice: Subject to any disclaimer, the term of this patent is extended or adjusted under 35 U.S.C. 154(b) by 811 days.

(21) Appl. No.: 10/238,617

(22) Filed: Sep. 11, 2002

(65) Prior Publication Data

US 2003/0048728 A1     Mar. 13, 2003

(30) Foreign Application Priority Data

Sep. 12, 2001   (JP)   ............................ P2001-275992

(51) Int. Cl.
*G11B 7/00*    (2006.01)

(52) U.S. Cl. ................................ 369/59.24; 369/47.17

(58) Field of Classification Search ............ 369/59.24, 369/47.17, 47.19, 47.18
See application file for complete search history.

(56) References Cited

U.S. PATENT DOCUMENTS 6,079,041 A * 6/2000 Kunisa et al. .............. 714/752

FOREIGN PATENT DOCUMENTS

JP     10-69646    3/1998

* cited by examiner

*Primary Examiner*—Nabil Hindi
(74) *Attorney, Agent, or Firm*—Drinker Biddle & Reath LLP

(57) ABSTRACT

The object of the present invention is to provide a data recording method and optic recording medium that is capable of reproducing address data accurately by reducing the correlation of address data between adjacent tracks, reducing the effect of cross-talk between adjacent tracks on the recording clock and by making it possible to apply a cross-talk canceller to the wobble signal. The data-recording method of recording data while controlling the correlation between a first data string and a second data string that are contained in recording data, and is provided with a selecting process of selecting inversion/no inversion of first data string such that the correlation between first data string and second data string is reduced; and a recording process of recording first data string according to selected inversion/no inversion polarity, and recording control code that indicates whether inversion/no inversion was selected for first data string.

9 Claims, 18 Drawing Sheets

INITIAL-VALUE SWITCHING METHOD

FEEDBACK SWITCHING METHOD ns

FIG. 8A
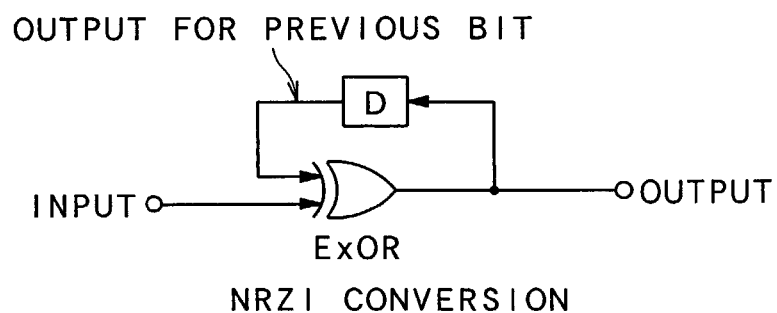
NRZI CONVERSION
FIG. 8B
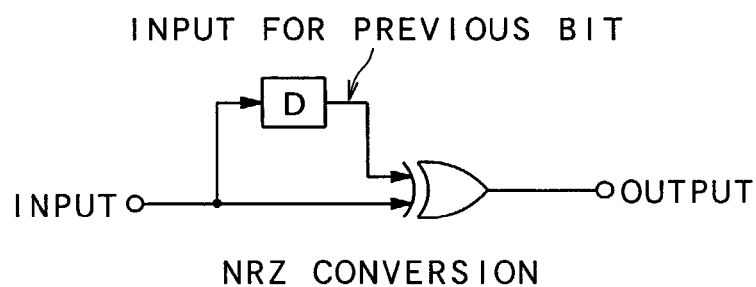
NRZ CONVERSION
FIG. 8C
| PREVIOUS BIT | INPUT BIT | OUTPUT |
|---|---|---|
| 0 | 0 | → 0 |
| 0 | 1 | → 1 |
| 1 | 1 | → 1 |
| 1 | 1 | → 0 |

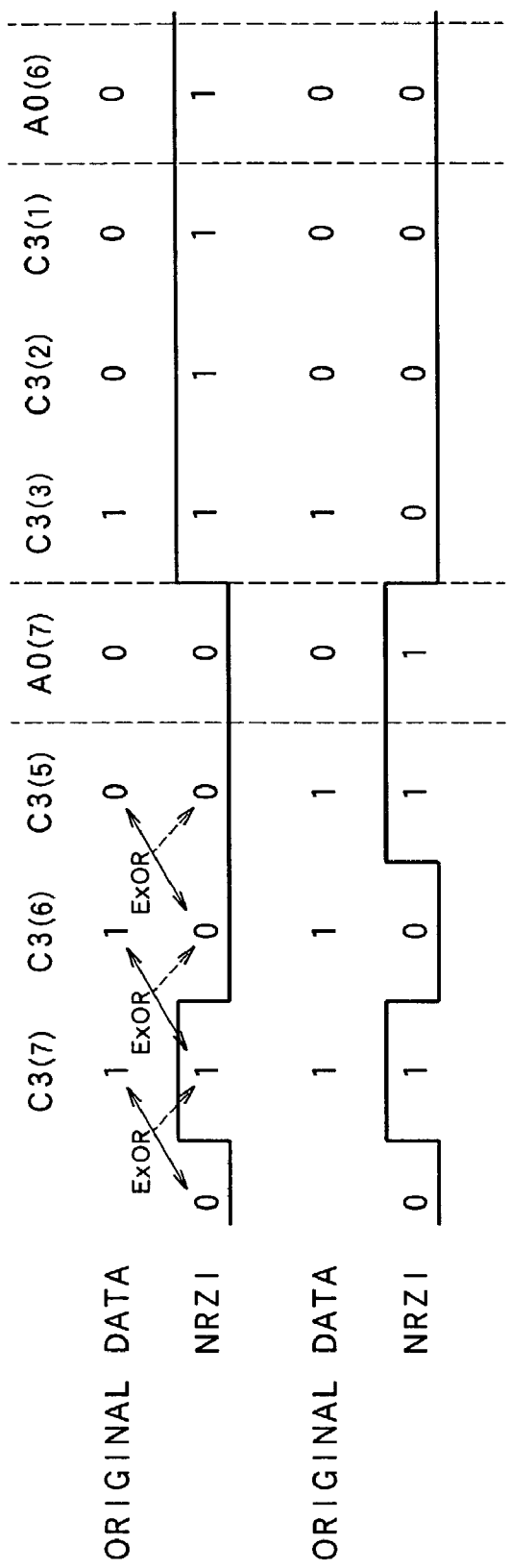

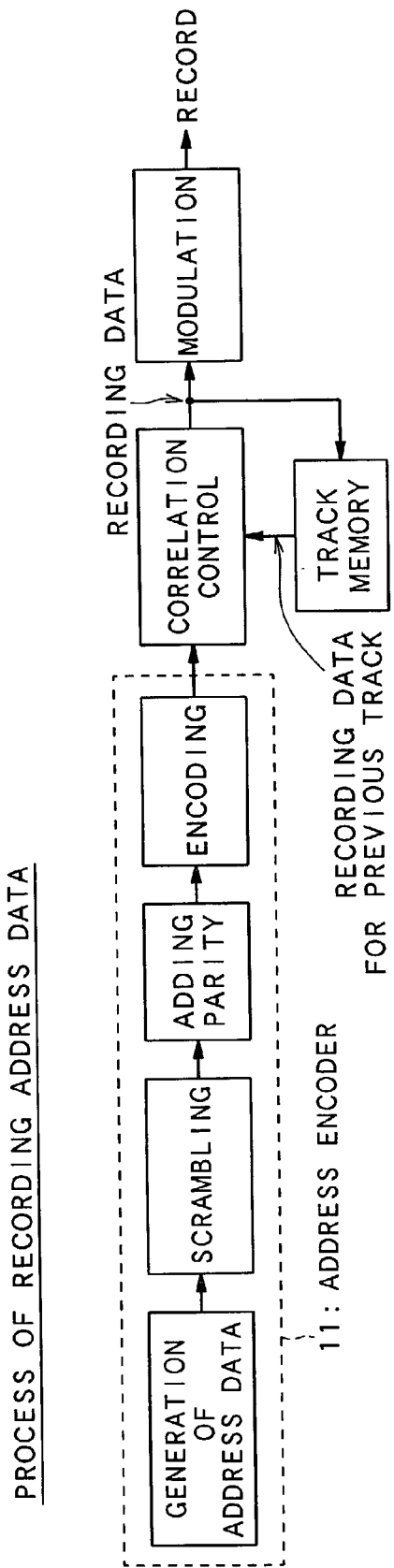

FIG. 13A

NO CORRELATION CONTROL

| SECTION CORRELATION | 3 | 0 | 4 | 0 | -2 | 0 | 3 | 0 | 4 |
|---|---|---|---|---|---|---|---|---|---|
| CONTROL CODE | 0 | | | | | | | | |
| SUMMATION(SUM) | 0 | 3 | 7 | 7 | 5 | 5 | 8 | 8 | 12 |

FIG. 13B

CORRELATION CONTROL

| ORIGINAL DATA SECTION CORRELATION | 3 | | 4 | | -2 | | -3 | | 5 |
|---|---|---|---|---|---|---|---|---|---|
| INVERSION/NO INVERSION | NO INVERSION | | INVERSION | | INVERSION | | INVERSION | | NO INVERSION |
| SECTION CORRELATION | 3 | | -4 | | 2 | | -3 | | 5 |
| SUMMATION(SUM) | 3 | | -1 | | 1 | | -2 | | 2 |
| CONTROL CODE | 0 | ←0 | 1 | ←1 | 0 | ←0 | 0 | ←0 | 1 |
| | NO INVERSION | INVERSION | INVERSION CONTINUES | INVERSION CONTINUES | INVERSION OF INVERSION = NO INVERSION |

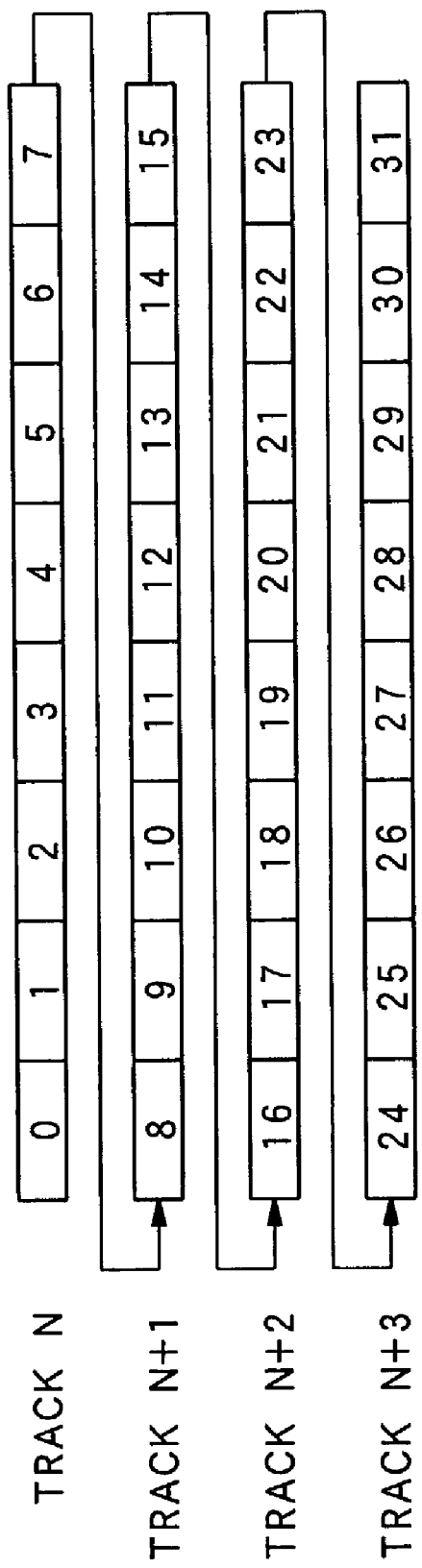

DATA RECORDING METHOD AND DATA RECORDING MEDIUM

BACKGROUND OF THE INVENTION

1. Field of the Invention

This invention relates to a data recording method and data recording medium that make it possible to suppress the effects of cross-talk by reducing the correlation of recorded data.

2. Description of the Related Art

Currently, optical discs, such as CDs and DVDs, are widely used. In recent years, in addition to CD-DA (CD-Digital Audio), which is a recording medium for reproduction only, CD-R (CD-Recordable), which allows recording digital data only one time, and CD-RW (CD-ReWritable), which allows rewriting digital data a multiple of times, have also come to be used.

When recording data onto or when reproducing data from an optical disc, it is necessary to rotate the optical disc at a specific rpm, and in the case of a recording medium for reproduction only, it is possible to obtain the specified rpm by synchronizing the rpm with the reproduction frequency of the digital data. On the other hand, in the case of a recordable recording medium such as CD-R or CD-RW, there are no digital data initially recorded on the tracks and it is not possible to control the rpm using the same method. Therefore, in the case of a recordable recording medium, the track (group track) that corresponds to the address data wobbles, and the rpm is controlled based on a wobble signal that is read from that track and the address of the track is identified.

Currently, a method of recording an FM modulated wobble signal on the track is known as a method for recording address data that uses wobbling. Also, a method of recording address data on a track by phase modulation of the wobble signal is disclosed in Japanese Laid-open patent application No. H10-69646.

However, there is a demand to further increase the recording density of an optical disc. In order to increase the recording density of an optical disc, it is necessary to reduce as much as possible the spacing between spiral shaped tracks (spacing in the radial direction of the optical disc), however reducing the spot diameter of the laser beam such that it fits completely in the area formed by the track becomes difficult, and a problem exists in that cross-talk from an adjacent tracks occurs.

FIGS. 22A to 22D are figures showing the effect of cross-talk from an adjacent track on the wobble signal. FIG. 22A shows the case when the wobble of the adjacent tracks has the same phase, FIG. 22B shows the case when the wobble of the adjacent tracks has the reverse phase, FIG. 22C show the case when the wobble of the adjacent tracks lags by 90 degrees, and FIG. 22D shows the case when the wobble of the adjacent tracks leads by 90 degrees. FIGS. 22A to 22D, show the effect of the adjacent tracks (track n and track n+2) on the wobble signal for a center track that is indicated as track n+1.

Also, there is a problem in that jitter in the recording clock that is generated by a PLL (phase locked loop) from the wobble increases due to the effect of this kind of cross-talk. The wobble signal is not only used for controlling the disc rotation, but is also used for generating a clock (recording clock) by way of the PLL that becomes a time reference when recording data onto the disk. Therefore, as shown in FIG. 22C or FIG. 22D, for example, when the wobble signal fluctuates in the time-axis direction due to the effect of cross-talk, there is a chance that it will cause jitter in the recording clock.

A method has also been proposed of canceling out cross-talk from the wobble signal. This method detects the cross-talk based on the correlation between the wobble signal from the track being reproduced and the tracks adjacent to that track. In this case, in order to be able to detect the cross-talk, the correlation between the wobble signals is controlled such that it is a minimum. Addresses are normally assigned serial numbers that increase in order incrementally, which gives a strong correlation between addresses of adjacent tracks. Therefore, naturally a strong correlation occurs between the wobble signals of tracks that are modulated and recorded based on the address data. In this method, when there is a strong correlation between addresses, it is not possible to detect the cross-talk accurately. Therefore, it is not possible to reproduce the address data accurately.

In order to solve the problems described above, the object of the present invention is to provide a data recording method and optic recording medium that is capable of reproducing address data accurately by reducing the correlation of address data between adjacent tracks, reducing the effect of cross-talk between adjacent tracks on the recording clock and by making it possible to apply a cross-talk canceller to the wobble signal.

SUMMARY OF THE INVENTION

The above object of the present invention can be achieved by a data-recording method of the present invention. The data-recording method of recording data while controlling the correlation between a first data string and a second data string that are contained in the recording data, and is provided with a selecting process of selecting inversion/no inversion of the first data string such that the correlation between the first data string and the second data string is reduced; and a recording process of recording the first data string according to the selected inversion/no inversion polarity, and recording control code that indicates whether inversion/no inversion was selected for the first data string.

According to the present invention, recording is performed by selecting inversion/no inversion for a first data string that will reduce the correlation between a first data string and a second data string such that it is possible to reduce the correlation between the first data string and second data string. Also, a control code that indicates whether inversion/no inversion is selected for the first data string is recorded, so it is possible to accurately restore the first data string.

In one aspect of the present invention can be achieved by the data-recording method of the present invention. The present invention wherein: the recording data are recorded in order on tracks of a disc-shaped recording medium, and the first data string and second data string are recorded on adjacent tracks.

According to the present invention, correlation between the first data string and second data string that are recorded on adjacent tracks is reduced, so it is possible to obtain an accurate tracking signal.

In another aspect of the present invention can be achieved by the data-recording method of the present invention. The data-recording method, wherein: the control code is contained in the first data string, and the selection procedure of selecting inversion/no inversion for the first data string selects whether to invert or not invert the first data string such that the correlation between the first data string, which contains the control code, and the second data string is reduced.

According to the present invention, correlation with the final recording data that contains the control code and first data string is reduced, so selecting inversion/no inversion for the first data string is executed under optimum conditions.

In further aspect of the present invention can be achieved by the data-recording method of the present invention. The data-recording method is further provided with an adding process of adding the control code to the start of the first data string according to whether inversion or no inversion is selected; and a performing process of performing NRZI conversion of the data generated by the adding process of adding the control code; and wherein the recording process of recording the first data string and the control code, records the data after the NRZI conversion.

According to the present invention, by performing NRZI conversion for just the first data string to which a specified control code is added to the start, it is possible to control inversion/no inversion of the first data string during recording according to the control code.

In further aspect of the present invention can be achieved by the data-recording method of the present invention. The data-recording method, wherein: the first data string and the second data string are address data for the recording medium on which the first string and the second data string are recorded.

According to the present invention, it is possible to read the address data accurately.

The above object of the present invention can be achieved by a data-recording method of the present invention. The data-recording method of scrambling and recording address data onto a recording medium and comprising: a generating process of generating scramble key data based on the address data; a selecting process of selecting different scrambling methods based on the key data and scrambling the address data; and a recording process of recording the key data and the scrambled address data on the recording medium.

According to the present invention, address data are scrambled by selecting a plurality of different scramble methods based on the key data, and then the key data and scrambled address data are recorded on the recording medium, so for example, by using different scramble methods for adjacent tracks, it is possible to reduced the correlation of the address data between adjacent tracks and thus suppress the effect of cross-talk on address data for the wobble signals. Therefore, for example, in addition to being able to reduce jitter in the recording clock, it is possible to accurately reproduce the address data.

In one aspect of the present invention can be achieved by the data-recording method of the present invention. The data-recording method, wherein: the scrambling process scrambles only the higher-order data of the address data and does not scramble the lower-order data of the address data; and wherein the lower-order data are used as the key data.

According to the present invention, only the higher-order address data, which have the largest effect on the correlation between data strings contained in the address data, are scrambled, so it is possible efficiently reduce the correlation between data strings. Also, the lower-order address data that do not have a large effect on the correlation between data strings can be effectively used as key data to restore the higher-order data.

In another aspect of the present invention can be achieved by the data-recording method of the present invention. The data-recording method is further provided with an interleaving process of interleaving the higher-order data of the scrambled address data and lower-order data of the address data that is used as the key data; a modulating process of modulating the data generated by interleaving and; a recording process of recording the after interleaving data on the recording medium.

According to the present invention, it is possible to reduce the correlation between lower-order address data as well, and thus it is possible to further reduce the correlation between the overall address data.

In further aspect of the present invention can be achieved by the data-recording method of the present invention. The data-recording method is, wherein the modulating process of modulating data executes NRZI conversion.

According to the present invention, the value of the lower-order address data changes according to the values of the data surrounding the lower-order address data, so it is possible to effectively reduce the correlation of the lower-order data.

In further aspect of the present invention can be achieved by the data-recording method of the present invention. The data-recording method is, wherein the modulating process of modulating data executes NRZ conversion.

According to the present invention, the value of the lower-order address data changes according to the values of the data surrounding the lower-order address data, so it is possible to effectively reduce the correlation of the lower-order data.

The above object of the present invention can be achieved by a data-recording medium of the present invention. The data-recording medium on which recording data are recorded while the correlation between a first data string and a second data string that are contained in the recording data is controlled, is provided with inversion/no inversion of the first data string is selected such that the correlation between the first data string and the second data string is reduced; and the first data string is recorded according to the selected inversion/no inversion polarity, and control code that indicates inversion/no inversion is selected for the first data string.

In one aspect of the present invention can be achieved by the data-recording medium of the present invention. The data-recording medium is, wherein: the control code is contained in the first data string, and inversion/no inversion for the first data string is selected such that the correlation between the first data string, which contains the control code, and the second data string is reduced.

According to the present invention, correlation with the final recording data that contains the control code and first data string is reduced, so selecting inversion/no inversion for the first data string is executed under optimum conditions.

In another aspect of the present invention can be achieved by the data-recording medium of the present invention. The data-recording medium is, wherein: the control code is added to the start of the first data string according to whether inversion or no inversion is selected; and NRZI conversion is performed on the data generated by a procedure of adding the control code; and when recording the first data string and the control code, the data is recorded after the NRZI conversion.

According to the present invention, NRZI conversion is performed on just the first data string to which a specified control code is added to the start, so it is possible to control inversion/no inversion of the first data string during recording according to the control code.

In further aspect of the present invention can be achieved by the data-recording medium of the present invention. The data-recording medium is, wherein: the first data string and the second data string are address data on the recording medium on which the first string and the second data string are recorded.

According to the present invention, it is possible to read the address data accurately.

In further aspect of the present invention can be achieved by the data-recording medium of the present invention. The data-recording medium is provided with address data for the data-recording medium are scrambled and the scrambled address data are recorded on the data-recording medium, and when performing the scrambling, only high-order data of the address data are scrambled.

According to the present invention, the higher-order address data that have a large effect on the correlation between data strings that contain the address data are scrambled, so it is possible to efficiently reduce the correlation between data strings.

In further aspect of the present invention can be achieved by the data-recording medium of the present invention. The data-recording medium is, wherein: lower-order data of the address data that are not scrambled are recorded on the data-recording medium as the scramble key data for the higher-order data.

According to the present invention, correlation between data strings that contain address data are effectively reduced and it is possible to restore the higher-order data by using the lower-order data as key data.

In further aspect of the present invention can be achieved by the data-recording medium of the present invention. The data-recording medium is, wherein: the higher-order data of the scrambled address data and lower-order data of the address data that is used as the key data are interleaved; the data generated by interleaving are modulated; and the modulated data are recorded on the data-recording medium.

According to the present invention, it is possible to reduce the correlation of lower-order address data, so it is possible to further reduce the correlation of the overall address data.

In further aspect of the present invention can be achieved by the data-recording medium of the present invention. The data-recording medium is, wherein: NRZI conversion is executed when modulating the data.

According to the present invention, the value of the lower-order address data changes according to the value of the data surrounding the lower-order address data, so it is possible to effectively reduce the correlation of the lower-order address data.

In further aspect of the present invention can be achieved by the data-recording medium of the present invention. The data-recording medium is, wherein: NRZ conversion is executed when modulating the data.

According to the present invention, the value of the lower-order address data changes according to the value of the data surrounding the lower-order address data, so it is possible to effectively reduce the correlation of the lower-order address data.

According to the present invention, the address data on the recording medium are scrambled so it is possible to reduce the correlation of the address data. Also, scramble key data are generated and recorded based on the original address data before scrambling, so it is possible to restore the scrambled address data.

BRIEF DESCRIPTION OF THE DRAWINGS

FIG. 3A shows an initial-value switching method, and FIG. 3B shows a feedback switching method.

FIG. 7A shows the entire method and FIG. 7B shows part of the method.

FIG. 8A, FIG. 8B and FIG. 8C are drawings showing the logic circuits for conversion, where FIG. 8A is a drawing of a logic circuit for NRZI conversion, FIG. 8B is a drawing of a logic circuit for NRZ conversion and FIG. 8C is a drawing showing a truth-value table for the circuits shown in FIG. 8A and FIG. 8B.

FIG. 9 is a time chart of the input/output data in NRZI conversion.

FIG. 10 is a drawing showing the process of recording address data in a third embodiment of the invention.

FIG. 11A shows the original address data, and FIG. 11B shows the state after control code has been inserted.

FIG. 13A and FIG. 13B are drawings showing the effect of correlation control, where FIG. 13A shows the case when correlation control is not executed, and FIG. 13 shows the case when correlation control is executed.

FIG. 18A shows the case when coefficient control is not performed, and FIG. 18B shows the case when coefficient control is executed.

FIG. 21 is a drawing showing the spiral-shaped tracks expanded into a straight linear shape.

FIG. 22A shows the case when wobble of the adjacent tracks have the same phase, FIG. 22B shows the case when the wobble of the adjacent tracks have the reverse phase, FIG. 22C shows the case when the wobble of the adjacent tracks lag by 90 degrees, and FIG. 22D shows the case when the wobble of the adjacent tracks lead by 90 degrees.

DESCRIPTION OF THE PREFERRED EMBODIMENTS

A first embodiment of the data-recording method of the invention will be explained with reference to FIG. 1 to FIG. 5.

First Embodiment

In the first embodiment of the data-recording method, the higher-order byte of the address data is scrambled and recorded, and the lower-order byte is recorded without being scrambled. The lower-order byte that is recorded without being scrambled is used as the scramble key data.

Figure 1:
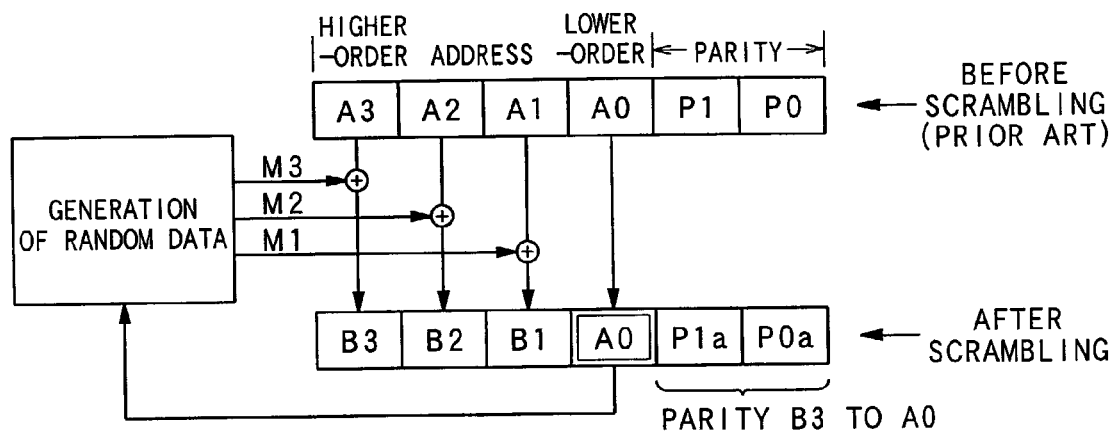
FIG. 1 is a drawing showing a first embodiment of the data-recording method of the invention.

FIG. 1 is a drawing showing the first embodiment of the data-recording method of the invention. As shown in FIG. 1, the ID comprises four bytes of address data, and two bytes of parity data. The address data before scrambling comprises four bytes of data, A3, A2, A1 and A0. Also, the parity comprises two bytes of data, P1 and P0.

In this first embodiment, the lowest-order data A0 of the address data stays as is, and the other higher-order data, A3 to A1 are scrambled. Data A0 is used as the scramble key data.

As shown in FIG. 1, random data M3, M2 and M1, which differ from each other, are generated based on the lowest-order data A0 that is contained in the address data. Also, data B3 are generated by taking the exclusive OR of data A3 and random data M3, data B2 are generated by taking the exclusive OR of data A2 and random data M2, and data B1 are generated by taking the exclusive OR of data A1 and random data M1.

By applying the 2-byte parity to the scrambled data B3 to B1 and the non-scrambled data A0, random parity is generated from the two bytes of data P1 and P0 since data B3 to B1 are randomized.

Instead of applying parity to the scrambled address data, it is possible to scramble the data P1 and P0 that are added to the address data before scrambling to obtain data P1$a$ and P0$a$.

Since the higher-order bytes of the address data do not change frequently, strong correlation occurs between adjacent tracks when those data are recorded as they are. However, in this first embodiment, the higher-order data A3 to A1 are scrambled and then recorded, so it is possible to greatly reduce the correlation between adjacent tracks.

On the other hand, since the lower-order bytes of address data change frequently, strong correlation does not occur between adjacent tracks for data A0. Therefore, there is no chance of strong correlation occurring between adjacent tracks even though the lower-order data A0 of the address data are recorded as scramble key data without being scrambled.

In this first embodiment, it is possible to randomize the higher-order bytes that create a strong correlation in this way, and by using the lower-order byte that does not create strong correlation as the scramble key data, it becomes possible to descramble the address data during reproduction.

It is also possible to record the scrambled signal as is, for example, it is possible to modulate the signal using a method such as phase-shift keying and then record the signal.

Figure 2:
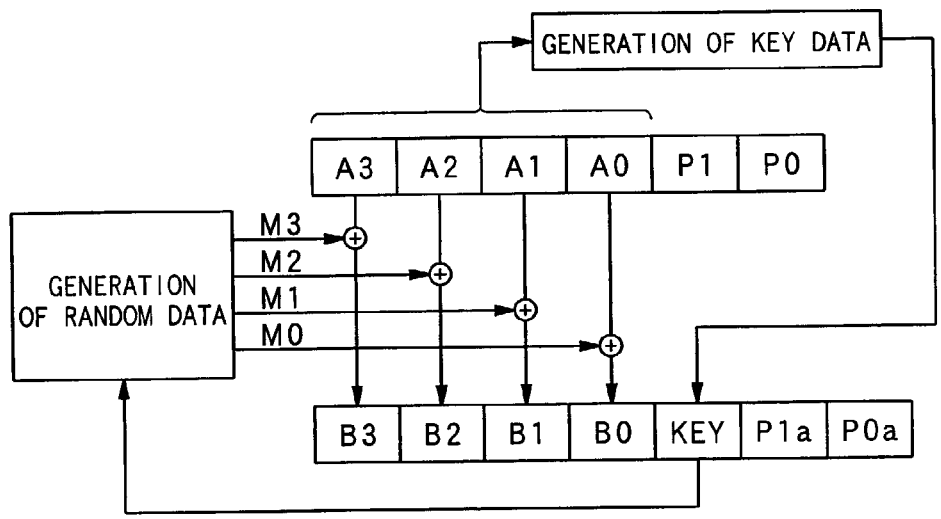
FIG. 2 is a drawing showing a different form of the first embodiment of the data-recording method of the invention.

FIG. 2 is a drawing showing an example of a different form of the first embodiment of the data-recording method of the invention. In the example shown in FIG. 2, the lower-order byte of address data does not remain as is to be used as key data, but rather the scramble key data are generated based on the address data, and those key data are added to the ID.

As shown in FIG. 2, in this example, key data are generated based on the address data A3 to A0, and then random data M3 to M0 are generated based on the key data. Also, data B3 are generated by taking the exclusive OR of address data A3 and random data M3, data B2 are generated by taking the exclusive OR of address data A2 and random data M2, data B1 are generated by taking the exclusive OR of address data A1 and random data M1, and data B0 are generated by taking the exclusive OR of address data A0 and random data M0.

The 2-byte parity data P1 and P0 can be added to the scrambled data B3 to B0, or by scrambling data P1 and P0 that are added to the address data before scrambling, data P1$a$ and P0$a$ can be generated.

By thinking of the lower-order byte of the address data as key data, the configuration shown in FIG. 1 can be interpreted as a special case of the configuration shown in FIG. 2.

Figure 3A:
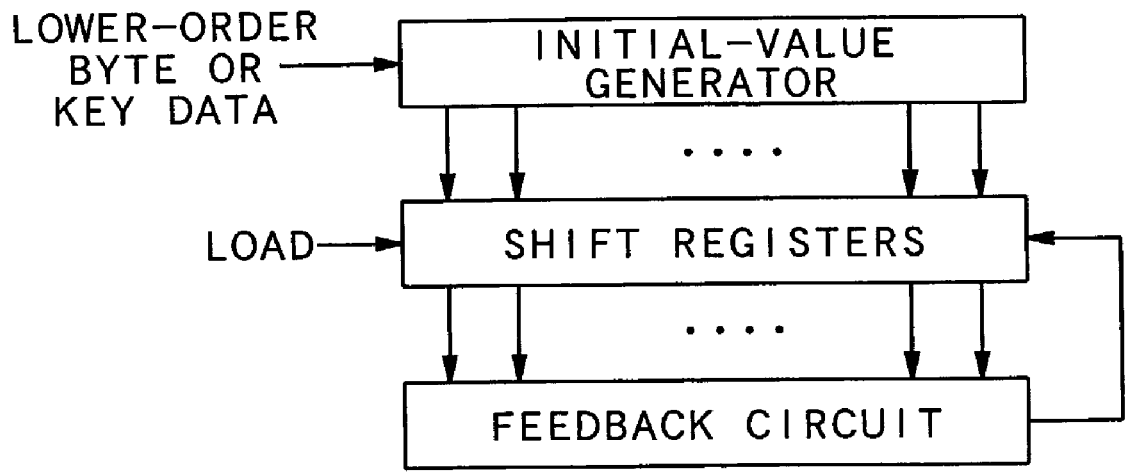
FIG. 3A and FIG. 3B are concept drawings of an Maximum-length sequences generation method, where
Figure 3B:
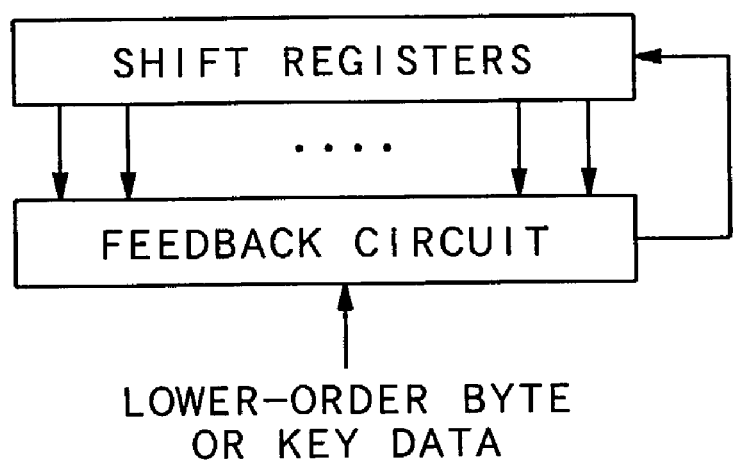

It is possible to use a typical Maximum-length sequences generation circuit as the method of generating the random data shown in FIG. 1 and FIG. 2. FIG. 3A and FIG. 3B are concept drawings showing the Maximum-length sequences generation method, where FIG. 3A shows an initial-value switching method, and FIG. 3B shows a feedback switching method. Also, FIG. 4 is a block diagram showing the configuration of a scramble circuit that corresponds to the initial-value switching method, and FIG. 5 is a block diagram showing the configuration of a scramble circuit that corresponds to the feedback switching method.

As shown in FIG. 3A, in the initial-value switching method, initial values are generated based on the lower-order byte of the address data or based on the scramble key data.

Figure 4:
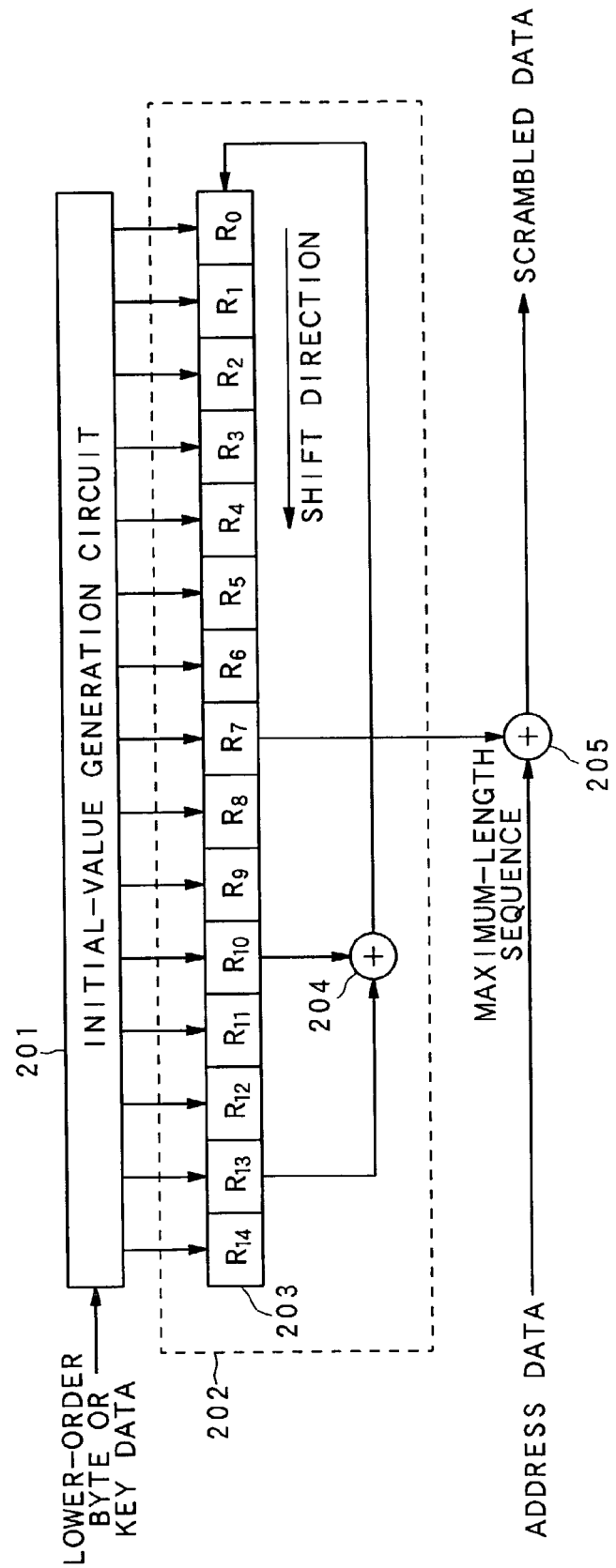
FIG. 4 is a block diagram showing the configuration of a scramble circuit that corresponds to the initial-value switching method.
Figure 5:
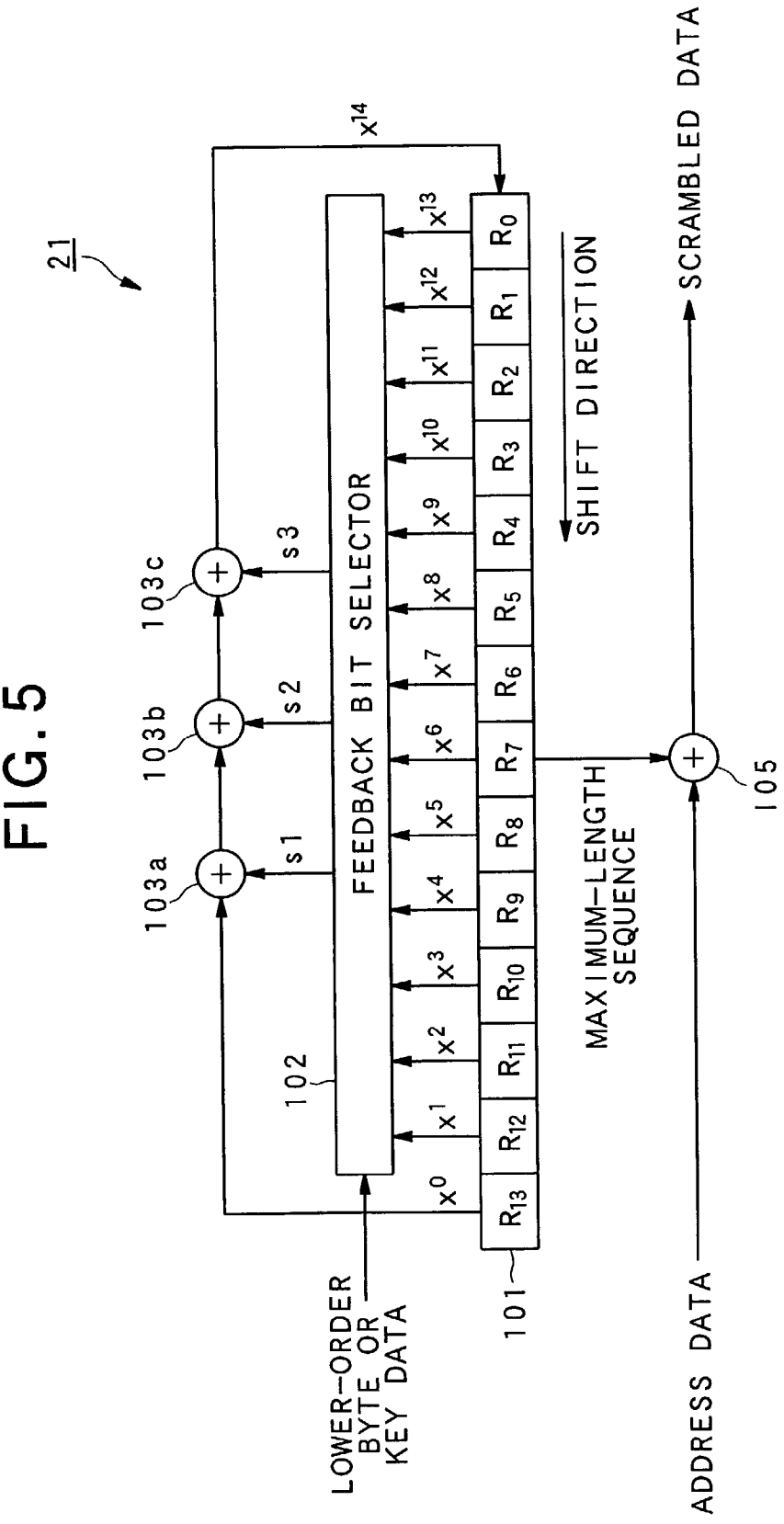
FIG. 5 is a block diagram showing the configuration of a scramble circuit that corresponds to the feedback switching method.

The scramble circuit shown in FIG. 4 comprises an initial-value generation circuit 201, an Maximum-length sequences generation circuit 202 comprising a shift register 203 and EXOR circuit 204, and an EXOR circuit 205. The Maximum-length sequences generation circuit 202 shown in FIG. 4 is an example of configuration using a 15-stage (R0 to R14) shift register 203, and together with shifting the bits from each stage in order in the shift direction, the EXOR circuit 204 takes the exclusive OR of the bits output from specified stages (R10 and R14 in FIG. 4) of the shift register 203 and feeds the result back to the initial stage R0. The Maximum-length sequences generation circuit 202 generates an Maximum-length sequences of random data having a $2^{15}-1$ (bits) cycle.

On the other hand, the initial-value generation circuit 201 prepares in advance a plurality of partial series that appear in the Maximum-length sequences cycle as initial values based on the recording position data for the disc, and from among these values sets initial values that are selected based on the lower-order byte of the address data or on the key data, and sets them for the Maximum-length sequences generation circuit 202. More specifically, it is possible to prepare a table for conversion between the lower-order byte of the address data or key data and the initial values. It is also possible to use the initial values as they are as the key data shown in FIG. 2.

Since construction is such that the initial values are switched in this way by the initial-value generation circuit 201, it is possible to perform different scrambling according to the recording position. Also, by taking the exclusive OR of the output bit from a specified stage (R7 in FIG. 4) of the shift register 203 and the address data in the EXOR circuit 205, the address data are scrambled and output from the circuit as scrambled data.

As shown in FIG. 3B, in the feedback switching method, the feedback circuit is switched based on the lower-order byte of the address data or the scramble key data.

The Maximum-length sequences generation circuit 21 shown in FIG. 5 comprises a 14-stage shift register 101, feedback bit selector 102 and EXOR circuits 103a to 103c. Here, through the function of the feedback bit selector 102 as a way of switching the feedback of the Maximum-length sequences generation circuit 21, the connection to the output bits from each stage of the shift register 101 is switched and it is possible to selectively set a plurality of primitive polynomials.

In FIG. 5, the shift register 101 has fourteen stages represented by R0 to R13, and shifts sequential data in the shift direction indicated by the arrow (direction from R0 to R13), then outputs output bits (x0 to x13) from each stage based on the specified primitive polynomials. The thirteen output bits are entered into the feedback bit selector 102 which then sets a connection relationship that corresponds to the setting data of the primitive polynomials that were selected based on the lower-order address data or key data, and outputs three selected bits s1, s2 and s3. More specifically, it is possible to prepare a conversion table for conversion between the lower-order byte of the address data or key data and the feedback bit position. For the case shown in FIG. 2, it is also possible to use the feedback bit position itself as key data.

Also, the EXOR circuit 103a takes the exclusive OR of the 0th-degree output bit (x0) from R13 of the shift register 101 and the selected bit s1. The EXOR circuit 103b takes the exclusive OR of the output bit from the EXOR circuit 103a and the selected bit s2. The EXOR circuit 103c takes the exclusive OR of the output bit from the EXOR circuit 103b and the selected bit s3. Finally, the output bit (x14) from the EXOR circuit 103c is fed back to the first stage R0 of the shift register 101.

The EXOR circuit 105 scrambles the address data by taking the exclusive OR of the output bit from a specified stage (R7 in FIG. 5) of the shift register 101 and the address data, and outputs the data as scrambled data.

Second Embodiment

A second embodiment of the data-recording method of the invention will be explained with reference to FIG. 6 to FIG. 9.

Similar to the data-recording method of the first embodiment, in the data-recording method of this second embodiment, the higher-order bytes of the address data are scrambled and the lower-order byte is not scrambled. However, in this second embodiment, the correlation between adjacent tracks is further reduced by performing interleaving of the scrambled higher-order bytes and non-scrambled lower-order byte.

Figure 6:
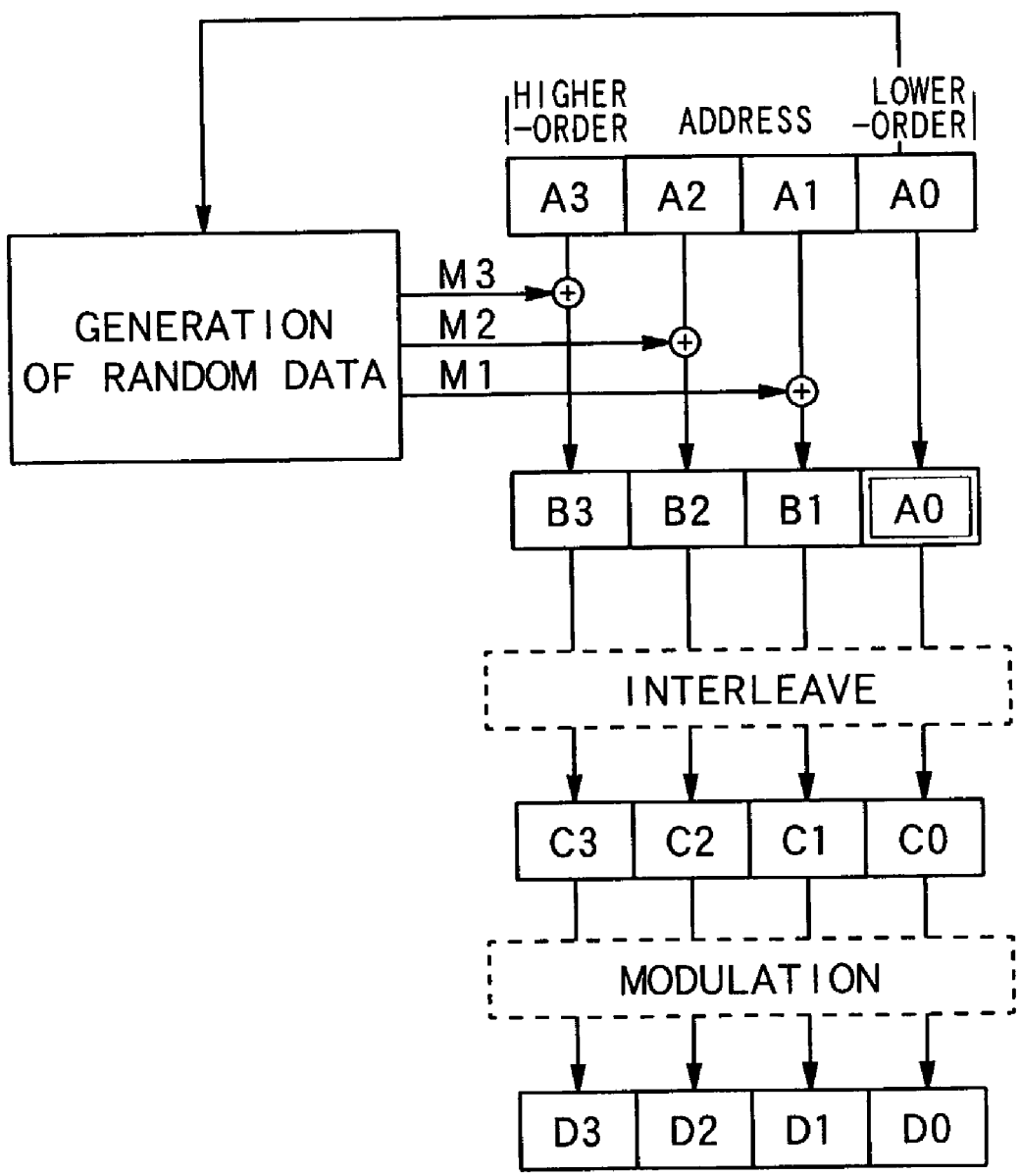
FIG. 6 is a drawing showing a second embodiment of the data-recording method of the invention.

FIG. 6 is a drawing showing the second embodiment of the data-recording method of the invention.

Similar to the first embodiment, in this second embodiment, random data M3, M2 and M1, which differ from each other, are generated based on the lowest-order data A0 contained in the address data. Also, data B3 are generated by taking the exclusive OR of address data A3 and random data M3, data B2 are generated by taking the exclusive OR of address data A2 and random data M2, and data B1 are generated by taking the exclusive OR of address data A1 and random data M1. The existence of parity is arbitrary.

Figures 7A, 7B:
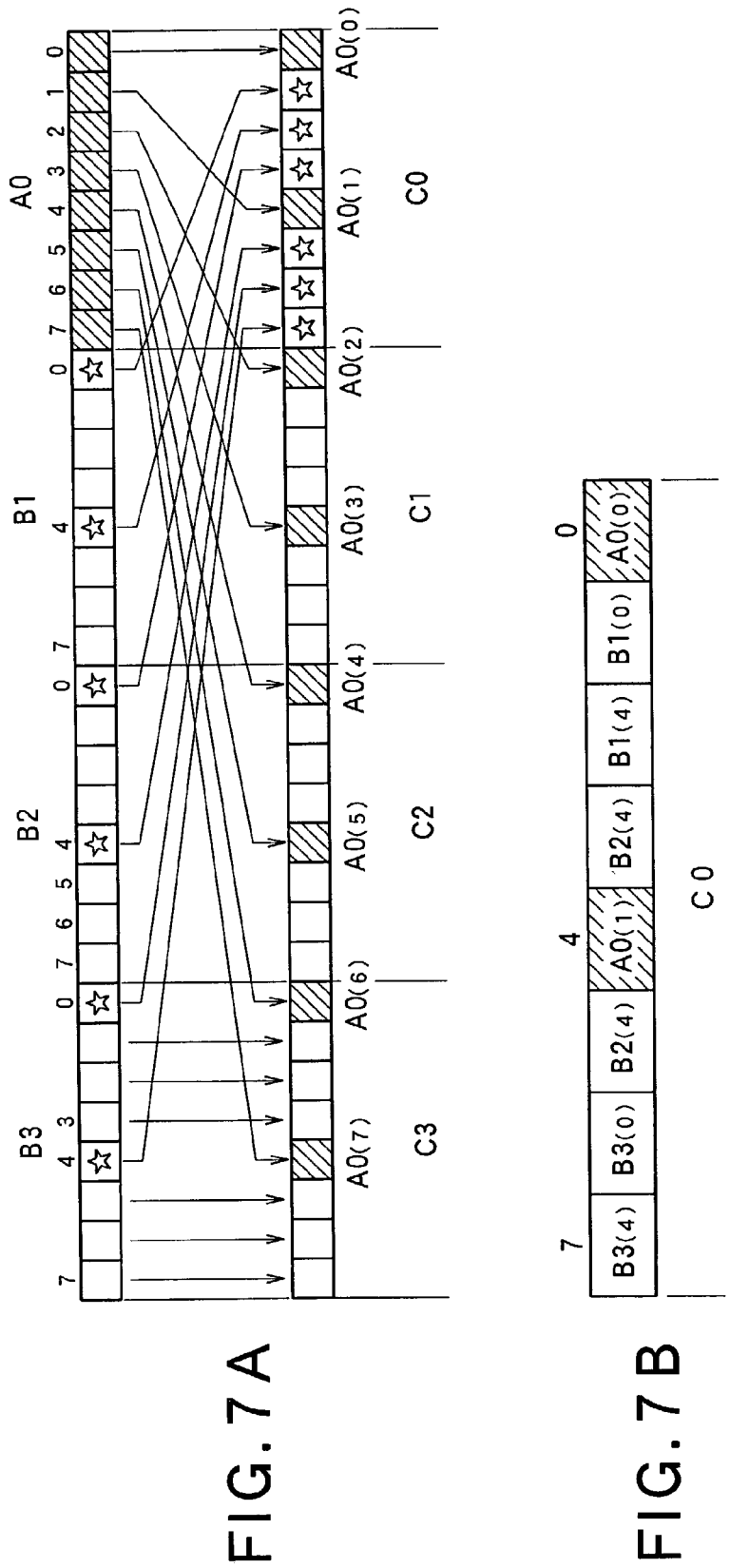
FIG. 7A and FIG. 7B are drawings showing an interleaving method, where

Next, interleaving is performed on data B3 to B1 and data A0. FIG. 7A and FIG. 7B are drawings showing the interleaving method, where FIG. 7A shows the entire method and FIG. 7B shows a part of the method.

As shown in FIG. 7A and FIG. 7B, the bits of the lower-order byte of data A0 of the remaining address data that are used as key data are rewritten (interleaved) with the positions of bit 4 and bit 0 of data B3 to B1 and data A0. The data corresponding to the positions of bit 4 and bit 0 of each byte are rewritten as the positions of specified bits of data A0. As shown in FIG. 6, by interleaving, data B3 to B1 and A0 are converted to data C3 to C0. With this kind of interleaving, each of the non-scrambled bits, or in other words, each of the bits of the data A0, which cause correlation to occur, are located between each bit of the randomized higher-order bytes.

Next data C3 to C0 are modulated depending on 1/0 state of the front/rear bits such that the modulated data differ. In this way, the modulated data of each bit of data A0 are randomized by the randomness of the front/rear bits. Therefore, it is possible to do away with the effect on correlation by data A0.

For example, NRZI conversion is conversion where the output is inverted when the data is 1 and the output is not inverted when the data is 0, and the conversion results are different depending on whether the previously converted bit is 1 or 0 even when the data are the same. Regardless of whether or not NRZI conversion is performed, it is possible to take the exclusive OR with the previous bit.

FIG. 8A, FIG. 8B and FIG. 8C are drawings showing the logic circuit for conversion, where FIG. 8A shows a logic circuit for NRZI conversion and FIG. 8B shows a logic circuit for NRZ conversion. FIG. 8C is a drawing showing a truth-value table for the circuits shown in FIG. 8A and FIG. 8B. FIG. 9 is a time chart for the input/output data in NRZI conversion. FIG. 9 shows the case of converting the bit sequence of data C3, and shows the case when A0(7) =A0(6)=0.

As shown in FIG. 8A to FIG. 8C, in NRZI and NRZ conversion, when the previous bit (previous one bit of output or input) is zero, the output bit becomes the same as the input bit. When the previous bit is 1, the output bit is inverted with respect to the input bit.

For example, when the bit of C3(5) in FIG. 9 changes, the bit of A0(7), which was rewritten in the position of C3(4), changes from 0 to 1. Also, in connection with this change, the bit of A0(6), which was rewritten in the position of C3(0), changes from 1 to 0. By changing the surrounding bits in this way, the values (0/1) immediately after conversion change even when the data are the same. Therefore, data A0 is randomized through this kind of conversion.

It is also possible to record the scrambled signal as is. For example, it is possible to modulate the signal using a method such as phase-shift keying, and then record the signal.

Third Embodiment

A third embodiment of the data-recording method of the invention will be explained with reference to FIG. 10 to FIG. 19.

In the following explanation, the correlation between two data strings is defined as "(Number of matching bits)– (Number of non-matching bits)". This definition is different than the normal definition of correlation, however, in order to simplify the explanation, this definition will be used here. For example, in the case of correlation between two identical data strings, all of the bits match, so it considered to be very positive correlation. When (Number of matching bits)= (Number of non-matching bits), the correlation is zero and there is no correlation between the data strings. In the case when none of the bits match, the data string is completely inverted and there is large negative correlation.

By inverting one of the two data strings, bits are changed such that bits that matched become non-matching bits, and bits that did not match become matching bits. So using the definition described above, it is possible to invert the polarity of the correlation between the data strings.

FIG. 10 is a drawing showing the process of recording address data in this third embodiment of the invention. As shown in FIG. 1, parity is added after scrambling the generated address data. By further encoding the data and comparing it with the data of the previous track, correlation control is executed to invert data in order to lower the correlation. Details about this correlation control will be described later. It is possible to record the data, for which correlation control was executed, as are. For example, it is possible to modulate the data using a method such as phase-shift keying, and then record the data.

As shown in FIG. 10, generating the address data, scrambling the data, adding parity and encoding the data can be executed by an address encoder 11. The order of performing encoding and correlation control can be switched.

Adding the parity as shown in FIG. 10 is adding code (parity) for detecting errors or for correcting errors.

Next, the correlation control will be explained. By controlling inversion/no inversion of the recording data, it is possible to control the polarity of the correlation. Therefore, it is possible to reduce correlation by properly selecting inversion/no inversion. However, by just inverting recording data, it is impossible to return to the original data (decode the data), so in addition to the recording data (ID), it is necessary to add control code that indicates whether the recording data have been inverted or not inverted.

Figure 11A:
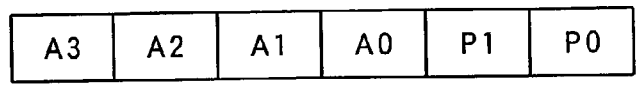
FIG. 11A and FIG. 11B are drawings showing an example of inserting control code between address data, where
Figure 11B:
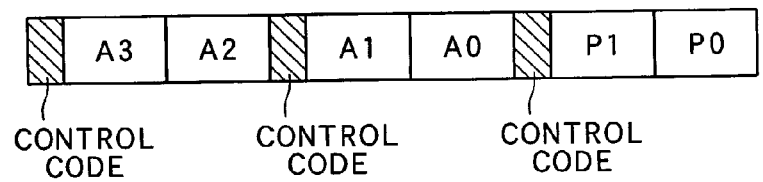

FIG. 11A and FIG. 11B are drawings showing an example of inserting control code between address data. FIG. 11A shows the original address data and FIG. 11B shows the state after the control code has been inserted.

Figure 12:
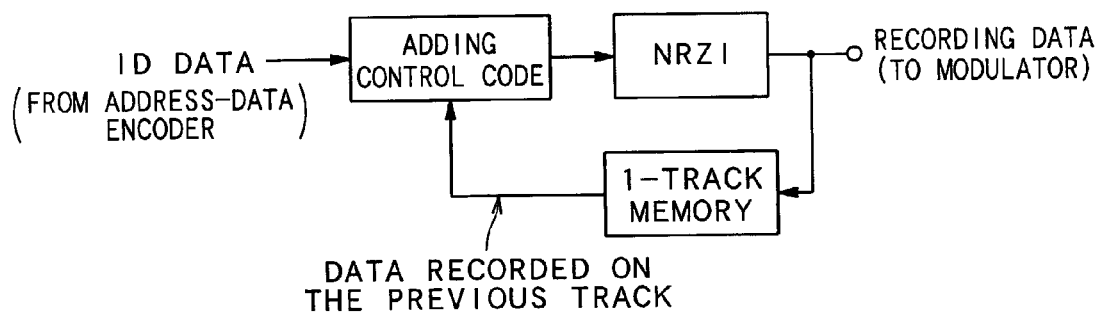
FIG. 12 is a drawing showing an example of the procedure for controlling the correlation control.

FIG. 12 shows an example of the correlation control procedure. In this example, the characteristics of NRZI conversion are used. In the case of recording after NRZI conversion, when '1' is inserted in the input data string, the recording data after it are inverted, and when '0' is inserted in the input data string, the recording data after it are not inverted. In using these characteristics, by inserting one bit of data at a certain interval in the input data string as correlation-control code, it is possible to control inversion/no inversion of the output data string (recording data). In other words, to invert recording data for a certain section, '1' is used as control code (control code added at the beginning of that section) to indicate no inversion/inversion for that section. Also, to not invert recording data for a certain section, '0' is used as control code (control code added at the beginning of that section) to indicate no inversion/inversion for that section.

By reading the control code during reproduction, it is possible to determine whether or not the data corresponding to that control code has been inverted and recorded, so it possible to properly decode data before NRZI conversion.

When determining whether or not to invert recording data for a specified section, in both the case to invert and record and the case to record without inverting, it is possible to calculate and determine the correlation with the data recorded on the previous track. In other words, in both the case when the control code is '0' (no inversion) and NRZI conversion is performed and the data are recorded, and the case when the control code is '1' (inversion) and NRZI conversion is performed and the data are recorded, the correlation between the data up until just before the next control code and the data that are recorded on the track before those data is calculated, and the control code that gives the smaller absolute value of correlation is selected as the control code and is inserted into the input data string. An example of the algorithm used for selecting the control code will be described later.

FIG. 13A and FIG. 13B are drawings showing the effect of correlation control, where FIG. 13A shows the case when correlation control is not executed, and FIG. 13B shows the case when correlation control is executed. In FIG. 13A, the correlation for each section is totaled, and the absolute value of the sum of the correlation increases. On the other hand, in FIG. 13B, by continuing to select control code such that the sum of the correlation becomes smaller, the absolute value of the sum of the correlation does not increase.

A method of using the NRZI conversion characteristics was explained as an example of correlation control, however, any kind of control code can be inserted as long as, 1) it is possible to control inversion/no inversion of recording data, and 2) it is possible to restore the original data even though the recording data have been inverted.

For example, together with simply inverting or not inverting the data for each specified section, it is possible to insert a bit as control code indicating whether inversion or no inversion has been performed for each section. By taking '1' to be control code indicating inversion, and '0' to be control code indicating no inversion, when the control code read during decoding is '1', it is possible to properly decode the data by inverting the data for that specified section.

As another example, there is a method of performing modulation and NRZI conversion by using RLL code to convert 1-bit data to 2-bit data. For example, by performing conversion such that when the original data is '0', the converted data becomes '10', and when the original data is '1', the converted data becomes '11', only 1T and 2T are output and the DC component is lost.

Figure 14:
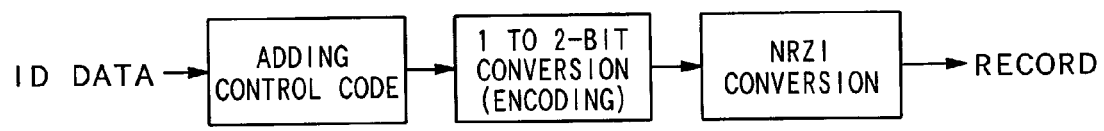
FIG. 14 is a drawing showing the recording procedure.

FIG. 14 shows the recording procedure in this case. As shown in FIG. 14, encoding by 1-bit to 2-bit conversion is executed after inserting control code into the ID data string. Next, NRZI conversion is performed and the data are recorded. When original data '0' is inserted as control data, it is converted to '10' by encoding. In this case, through NRZI conversion, Inversion+No inversion=Inversion. When the original data '1' is inserted as control code, it is converted to '11' by encoding. In this case, through NRZI conversion, Inversion+Inversion=No inversion. Therefore, by inserting control code into the data before encoding, it is possible to control inversion/no inversion.

Figure 15:
FIG. 15 is a drawing showing the procedure when adding control code to encoded data.

Inserting the control code 10/11 into the data after encoding instead of inserting control code 0/1 into the data before encoding, has completely the same effect. FIG. 15 shows the procedure in the case of adding control code to the data after encoding. In this case, as shown in FIG. 15, the control code 10/11 is inserted into the data after the ID code has been encoded. Next, NRZI conversion is performed and the data are recorded.

The methods described above are examples, and it is possible to arbitrarily select a method for inverting or not inverting the recording data. The data-recording method of this invention is not limited by the type of control code used, or the stage when the control code is inserted. Also, the invention is not limited by whether or not the data are recorded using NRZI conversion, or whether or not encoding is performed for the recording data.

Figure 16:
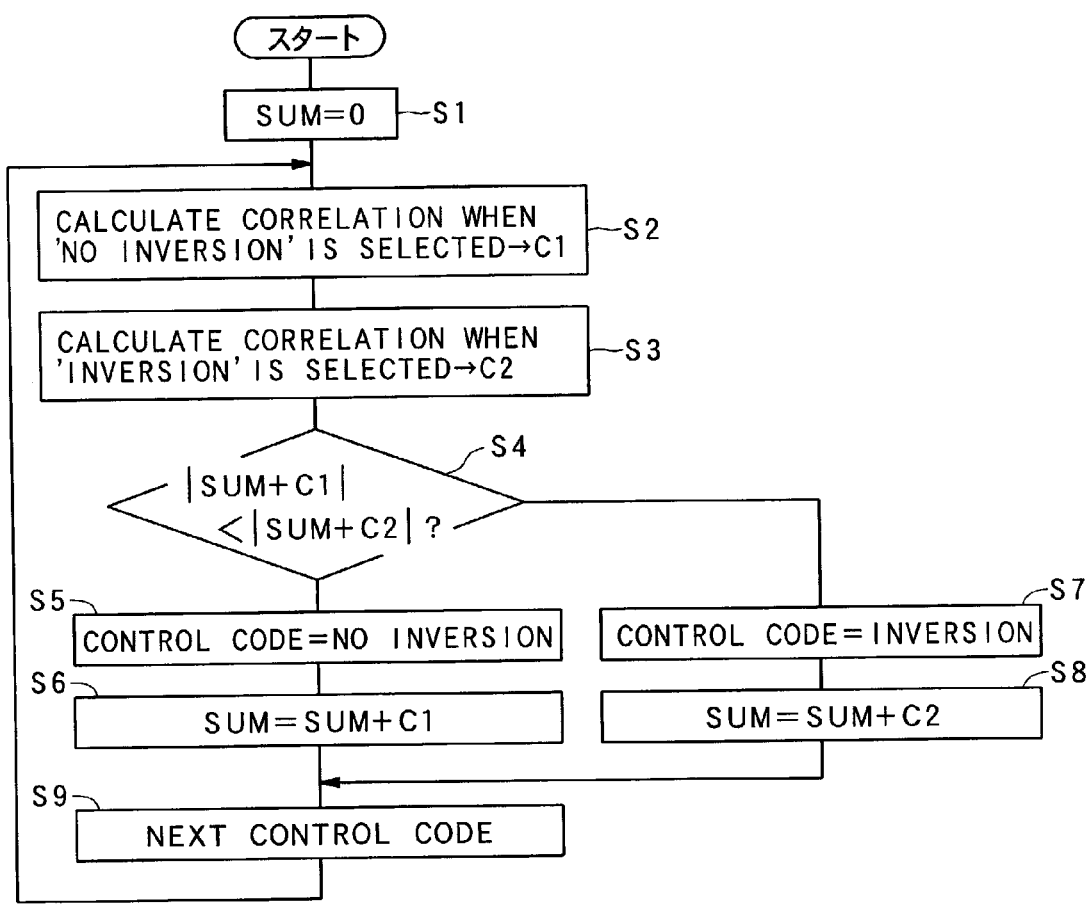
FIG. 16 is a flowchart showing the procedure of selecting control code.
Figure 17:
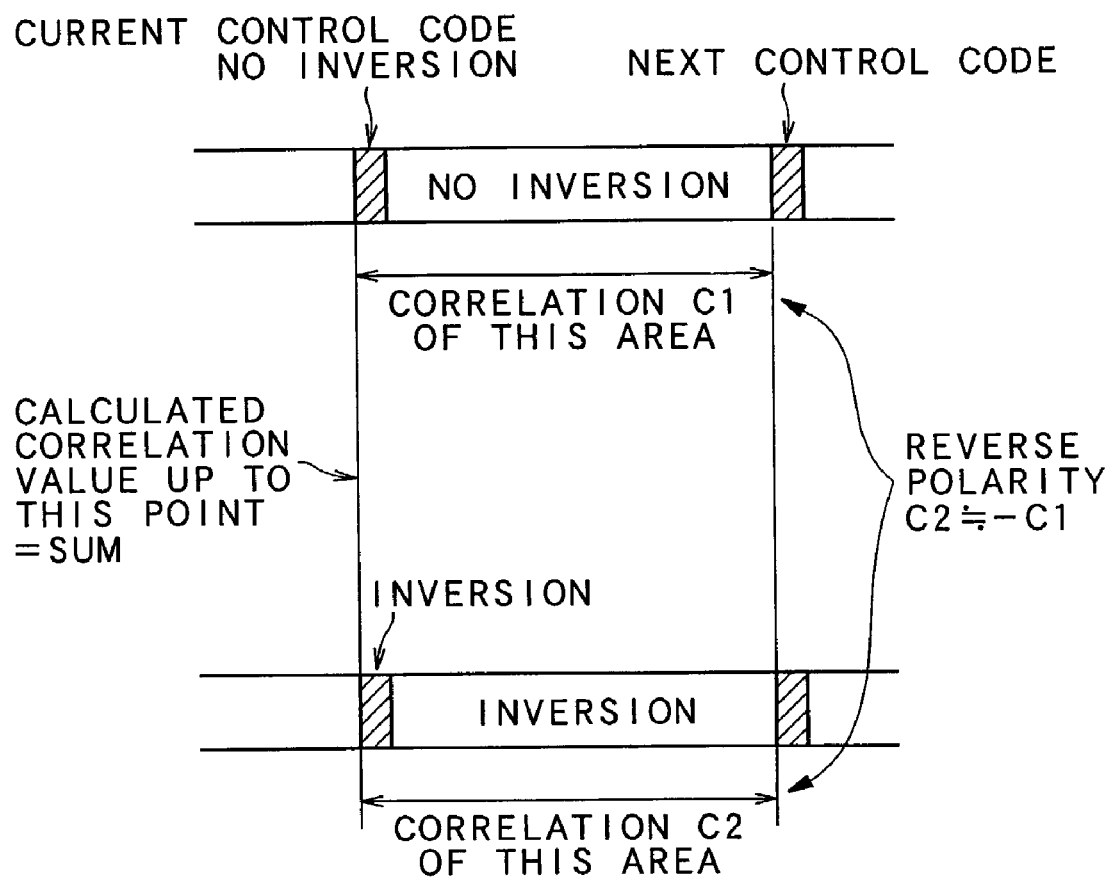
FIG. 17 is a drawing showing the method of selecting control code.

Next, FIG. 16 and FIG. 17 will be used to explain the algorithm for selecting the control code. FIG. 16 is a flowchart showing the procedure of selecting the control code, and FIG. 17 is a drawing showing the method of selecting the control code.

In step S1 in FIG. 16, the value of the correlation sum is reset to zero. Next, in step S2, assuming that the control code for no inversion has been selected, the correlation C1 for the section up to the next control code is calculated. Next, in step S3, assuming that the control code for inversion has been selected, the correlation C2 for the section up to the next control code is calculated.

As shown in FIG. 17, in step S2 and step S3, correlation between the data of the section starting from the control code, for which inversion/no inversion is to be determined, up to the start of the next control code, and the data of the previous track, is calculated. The correlation sum is the total of the correlation up to the start of the control code for which inversion/no inversion is to be determined.

Next, in step S4, the absolute value of the correlation sum to which C1 has been added and the absolute value of the correlation sum to which C2 has been added are compared to determine which is larger or smaller, and when it is determined that the latter value is larger, then the process advances to step S5, however, when it is determined that the former value is larger, then the process advances to step S7.

In step S5, the control code is set for no inversion. Next, in step S6, the correlation C1 is added to the sum and the process advances to step S9.

On the other hand, in step S7, the control code is set for inversion. Next, in step 8, the correlation C2 is added to the sum and the process advances to step S9.

In step S9, the control code for which inversion/no inversion is to be determined is switched to the next code and the process returns to step S2. By repeating the processing of step S2 to step S9, the control codes for each section are selected in order.

Figure 18A:
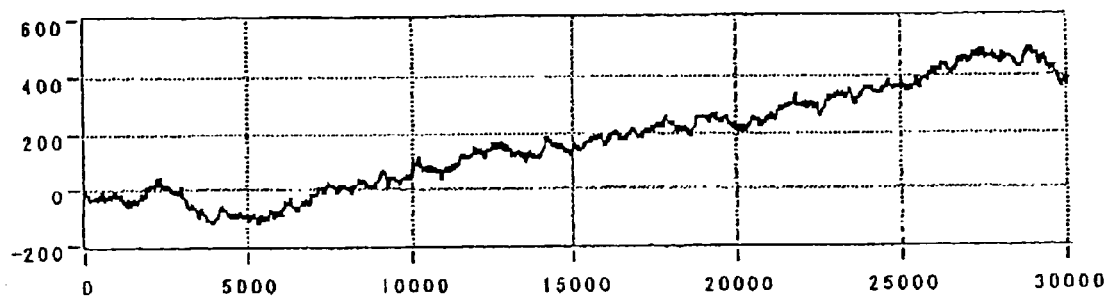
FIG. 18A and FIG. 18B are drawings showing the sum of the data correlation after 1-bit to 2-bit conversion (encoding) of two random series (Maximum-length sequences), where
Figure 18B:
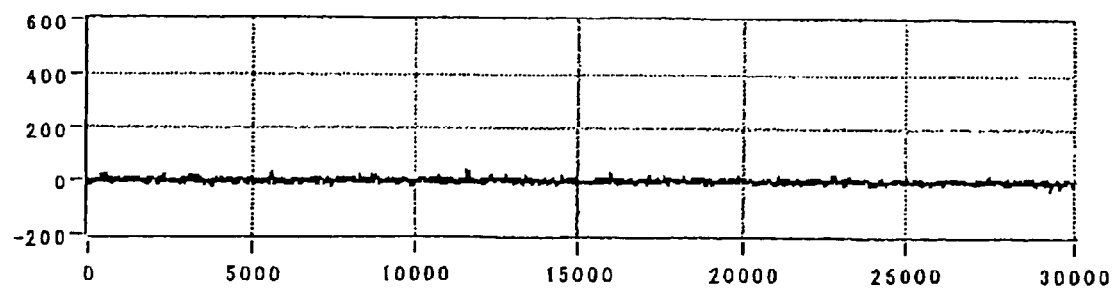

FIG. 18A and FIG. 18B are drawings showing the calculated sum of the correlation between two random series (Maximum-length sequences) after 1-bit to 2-bit conversion (encoding), where FIG. 18A shows the case when correlation control is not executed, and FIG. 18B shows the case when correlation control is executed. In FIG. 18B, after every two bytes (16 bits) 1-bit control code is inserted and then encoding is performed.

As shown in FIG. 18A, when control code is not inserted, the calculated sum of the correlation increases as the number of bits increases. That is, a certain amount of correlation occurs even when scrambling is performed using random series (Maximum-length sequences).

On the other hand, as shown in FIG. 18B, when control code is inserted, the calculated sum of the correlation does not increase as the number of bits increases. Therefore, it can be seen that by executing correlation control by inserting control code in this way, it is possible to effectively reduce the correlation.

Figure 19:
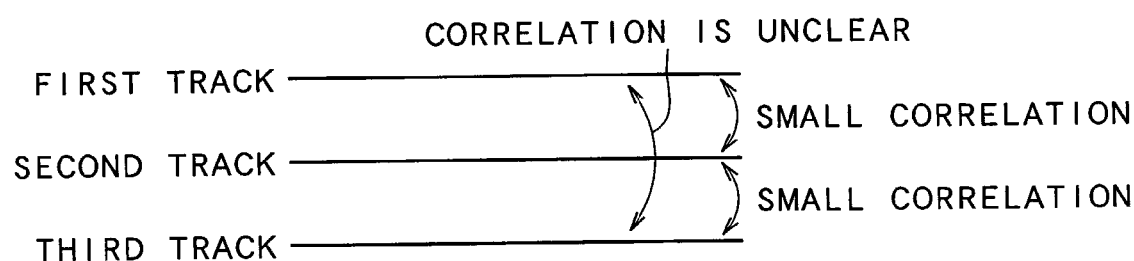
FIG. 19 is a drawing showing three adjacent tracks.

Next, correlation between three adjacent tracks will be explained. FIG. 19 is a drawing showing the correlation between three adjacent tracks.

In the correlation control described above, when recording the second track shown in FIG. 19, the control code for the recording data on the second track is controlled such that the correlation between the data recorded on the first track, which corresponds to the previous track, and the data to be recorded on the second track is a minimum. Therefore, the correlation between the first track and the second track is reduced.

Moreover, when recording a third track, the control code for the recording data on the third track is controlled such that the correlation between the data recorded on the second track, which corresponds to the previous track, and the data to be recorded on the third track is a minimum. Therefore, the correlation between the second track and the third track is reduced.

In this way, the correlation between the recorded signal on the second track and the recorded signals on the adjacent first track and third track is reduced. When the correlation between tracks is strong, it becomes difficult to extract the cross-talk component from the signal on the track being reproduced in order to cancel the cross-talk. In other words, it becomes difficult to distinguish between the signal itself on the track being reproduced and the cross-talk component. In this regard, with the correlation control described above, the correlation between adjacent tracks is reduced so this is no problem.

However, in this method, the correlation between the first track and the third track is not reduced. For example, when the signal on the first track is the same as the signal on the third track, it becomes difficult to determine which cross-talk component can be extracted and which track the cross-talk is from. Therefore, it is preferred that correlation be reduced by scrambling the signal of each track in advance. In addition, by executing the correlation control described above, the correlation between the signal on the track being reproduced and both of the tracks adjacent to that track is reduced.

Data-Recording Medium

Figure 20:
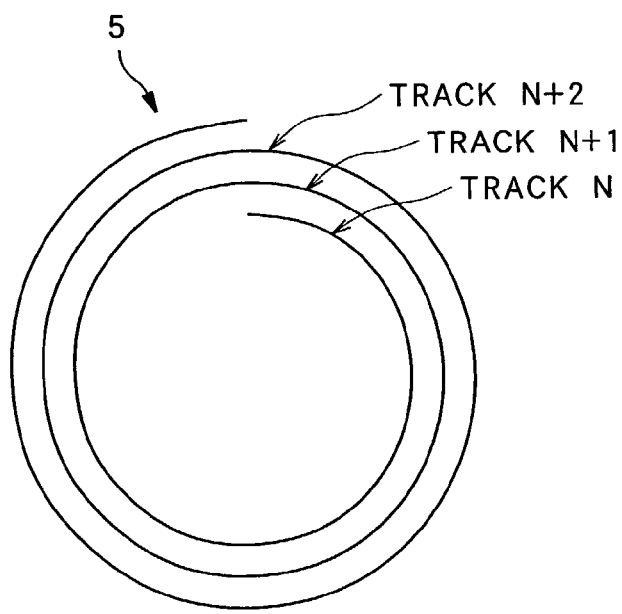
FIG. 20 is a drawing showing the configuration of tracks on an optical disc that is used as the recording medium to which the data-recording method of the invention is applied.
Figure 22A:
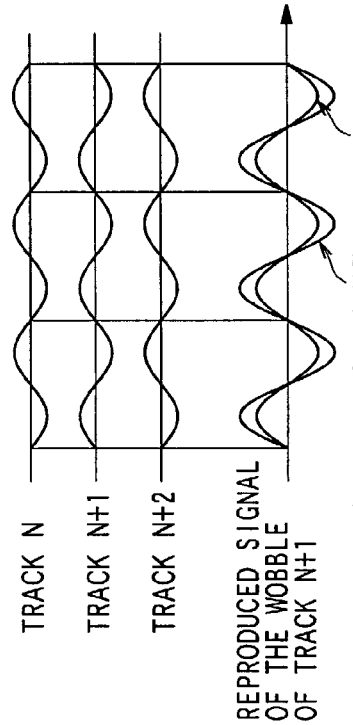
FIG. 22A, FIG. 22B, FIG. 22C and FIG. 22D are drawings showing the effect of cross-talk from adjacent tracks on the wobble signal, where
Figure 22C:
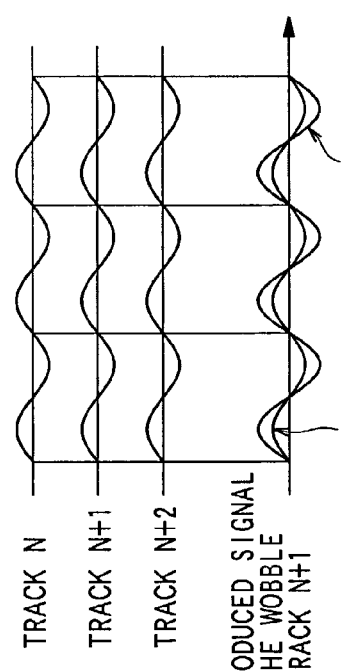
Figure 22B:
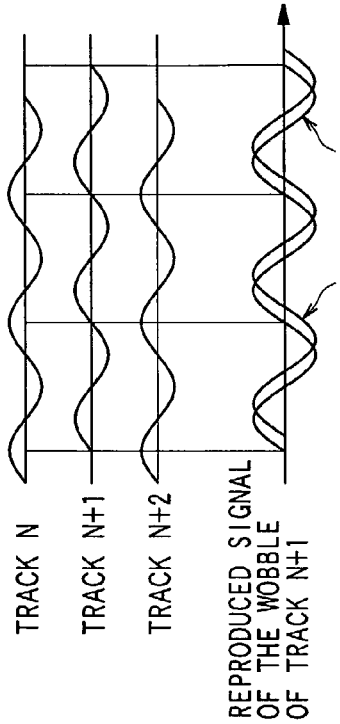
Figure 22D:
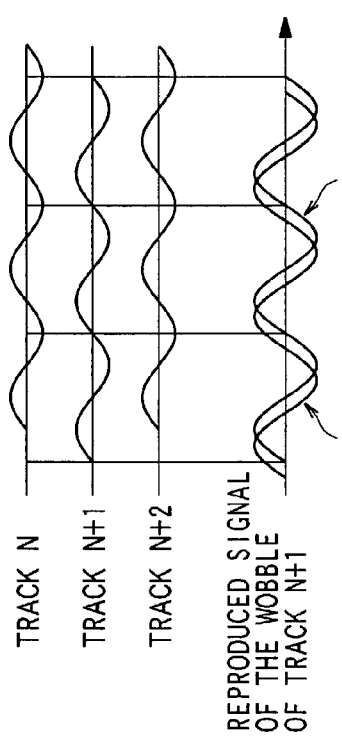

FIG. 20 is a drawing showing the track configuration on an optical disc 5 that is used as the data-recording medium to which the data-recording method of the invention is applied. A track is formed on the disc 5 in a spiral shape that runs from the inside to the outside. In FIG. 20, an example is shown in which track numbers (three tracks in FIG. 20, track n, track n+1 and track n+2) are assigned to each revolution starting from the inside.

It is possible to apply the data-recording method of this invention to the data that are recorded on the disc 5 shown in FIG. 20. In this case, it is possible to reduce the correlation between the address data on adjacent tracks as described above, and suppress the effects of cross-talk. It is preferred that the scrambling method be switched at intervals shorter than one revolution so that the same scrambling method is not used between adjacent tracks.

FIG. 21 is a drawing showing the spiral-shaped tracks shown in FIG. 20 expanded into a straight line, and shows eight addresses recorded around one track. The numbers (0 to 31) in FIG. 21 indicate the lower-order data on each track. In the case of the disc shown in FIG. 21, none of the lower-order data on the three adjacent tracks match. Therefore, as was shown in the embodiments described above, by selecting a different scrambling method corresponding to each respective lower-order data, the correlation between adjacent tracks is reduced. In this way, the same scrambling method does not appear in the tracks for at least two revolutions, and by switching the scrambling method in order, it is possible to reduce the correlation between adjacent tracks.

It is possible to record address data by performing phase-shift modulation (PSK modulation) or frequency modulation (FSK modulation) on the wobble signal after randomizing the address data by scrambling and reducing the correlation between adjacent tracks in this way. In this case, it is not possible to remove the bad state of the S/N ratio itself shown in FIG. 22A to FIG. 22D, however, since the states shown in FIG. 22A to FIG. 22D appear alternately at short intervals, none of the individual states continue for a long period of time. PLL does not follow change that is faster than the control range (normally about 1 kHz), so the generated recording clock operates in a state that is practically the average of the states shown in FIG. 22A to FIG. 22D, or in other words in a state with no cross-talk. Therefore, it is possible to reduce the effect of cross-talk on the recoding clock. Also, by reducing correlation of the data of adjacent tracks, it becomes possible to detect the cross-talk properly, and by canceling the cross-talk, it becomes possible to accurately reproduce the address data. Cancellation of the cross-talk referred to here is the reduction of the effects of cross-talk from adjacent tracks by adding or subtracting the wobble signals of adjacent tracks.

In the data-recoding method or data-recording medium of this invention, it is also possible to record the scrambled signals as are on the data-recording medium. For example, it is possible to perform modulation, such as phase-shift modulation, on the scrambled signal, and then record that modulated signal onto the data-recording medium.

The entire disclosure of Japanese Patent Application No. 2001-275992 filed on Sep. 12, 2001 including the specification, claims, drawings and summary is incorporated herein by reference in its entirety.

What is claimed is:

1. A data-recording method of recording data while controlling the correlation between a first data string and a second data string that are contained in said recording data, and comprising:
    a selecting process of selecting inversion/no inversion of said first data string such that the correlation between said first data string and said second data string is reduced; and
    a recording process of recording said first data string according to said selected inversion/no inversion polarity, and recording control code that indicates whether inversion/no inversion was selected for said first data string.

2. The data-recording method according to claim 1, wherein
    said recording data are recorded in order on tracks of a disc-shaped recording medium, and
    said first data string and second data string are recorded on adjacent tracks.

3. The data-recording method according to claim 1, wherein
    said control code is contained in said first data string, and
    said selection procedure of selecting inversion/no inversion for said first data string selects whether to invert or not invert said first data string such that the correlation between said first data string, which contains said control code, and said second data string is reduced.

4. The data-recording method according to claim 1, further comprising:
    an adding process of adding said control code to the start of said first data string according to whether inversion or no inversion is selected; and
    a performing process of performing NRZI conversion of the data generated by said adding process of adding said control code; and wherein
    said recording process of recording said first data string and said control code, records said data after said NRZI conversion.

5. The data-recording method according to claim 1, wherein
    said first data string and said second data string are address data for the recording medium on which said first string and said second data string are recorded.

6. A data-recording medium on which recording data are recorded while the correlation between a first data string and a second data string that are contained in said recording data is controlled, comprising:
    inversion/no inversion of said first data string is selected such that the correlation between said first data string and said second data string is reduced; and
    said first data string is recorded according to said selected inversion/no inversion polarity, and control code that indicates inversion/no inversion is selected for said first data string.

7. The data-recording medium according to claim 6, wherein
    said control code is contained in said first data string, and inversion/no inversion for said first data string is selected such that the correlation between said first data string, which contains said control code, and said second data string is reduced.

8. The data-recording medium according to claim 6, wherein
    said control code is added to the start of said first data string according to whether inversion or no inversion is selected; and
    NRZI conversion is performed on the data generated by a procedure of adding said control code; and
    when recording said first data string and said control code, said data is recorded after said NRZI conversion.

9. The data-recording medium according to claim 6, wherein
    said first data string and said second data string are address data on said recording medium on which said first string and said second data string are recorded.

* * * * *